April 19, 1955 R. W. MANN 2,706,405
AIR ABSORPTION DYNAMOMETER
Filed Sept. 17, 1954

INVENTOR
ROBERT W. MANN
BY
ATTORNEYS

United States Patent Office 2,706,405
Patented Apr. 19, 1955

2,706,405

AIR ABSORPTION DYNAMOMETER

Robert W. Mann, Lexington, Mass., assignor, by mesne assignments, to the United States of America as represented by the Secretary of the Navy Application September 17, 1954, Serial No. 456,894

6 Claims. (Cl. 73—134)

This invention relates generally to dynamometers and more specifically to air absorption dynamometers for measuring the power of high speed rotary machinery.

Power measurement of high speed rotary machinery such as turbines, particularly in low power ranges, cannot be readily accomplished with standard dynamometers. This is particularly true for any of such requirements as extreme accuracy, measurement of transient output power, and very high rotative speds over a relatively wide power range. For example, the windage load of dynamometer rotors, particularly when driven at high speed, absorb so much power that sources in the low power range have heretofore produced little or no indication on conventional dynamometers.

It is therefore an object of this invention to provide a dynamometer for accurately measuring the output of high speed machines over a relatively wide power range.

It is another object of this invention to provide a dynamometer capable of measuring power at very high rotative speeds.

It is another object of this invention to provide an air absorption dynamometer having a closed air circulation path and an integral heat exchanger.

It is another object of this invention to provide a dynamometer including means for controlling the density of the working fluid.

It is another object of this invention to provide a simplified construction for an air absorption dynamometer.

Figure 1:
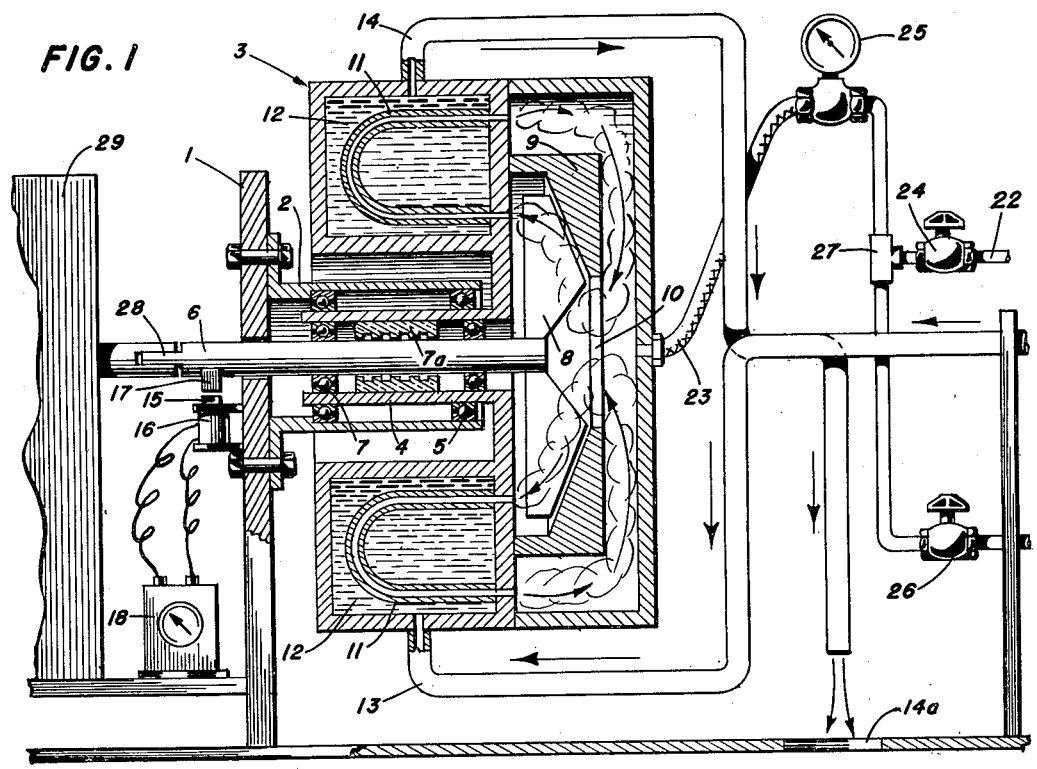
Figure 2:
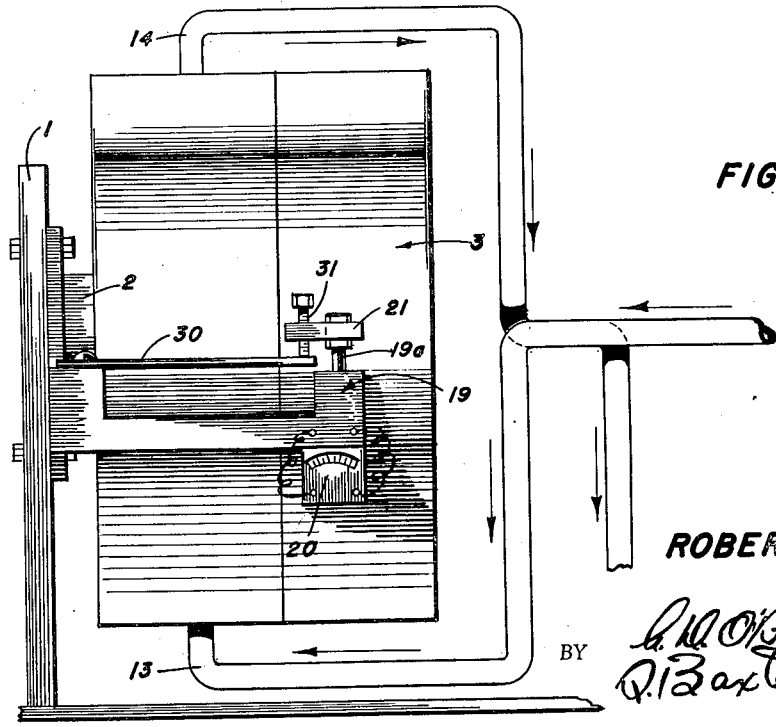

Other objects and many of the attendant advantages of this invention will be readily appreciated as the same becomes better understood by reference to the following detailed description when considered in connection with the accompanying drawings wherein:

Fig. 1 represents a side view in cross section of a preferred embodiment of this invention; and Fig. 2 is a side elevation view of a portion of Fig. 1.

It has been found that because of the large windage load developed by rotating a dynamometer at high speed, low power ranges can be measured only by providing a small rotor and a small volume of braking fluid, which then render the system incapable of handling much greater power ranges. However, by providing a small closed circulation path for the brake fluid (air) and a means for regulating its density or pressure, low power ranges can be measured without sacrificing the ability to absorb much larger loads. Extending the range of a low power sensitive dynamometer requires an extremely efficient and compact heat exchanger for rapidly cooling the small quantity of air available in the low volume compressor, particularly since a closed path with closely regulated pressure is required to satisfy accuracy demands and widened ranges. The invention hereinafter disclosed and described has been used to measure the torque output of small turbines generating between 0.1 and 25 horsepower and operating at speeds up to 60,000 R. P. M. In addition, the invention is adaptable to uses in other ranges.

Referring now to Fig. 1 in detail, the vertical stationary support 1 mounts a cylindrical bearing housing 2. The main stator housing 3 has a sleeve 4 which is rotatively supported in bearing housing 2 by precision ball bearings 5. The dynamometer input shaft 6 is rotatably mounted in the sleeve 4 by additional precision bearings 7. A labyrinth seal 7a between shaft 6 and sleeve 4 minimizes air leakage to or from the dynamometer. The inner end of the input shaft 6 supports a vaned radial compressor 8 shown in elevation. Mounted within the stator housing 3 is a rotor shroud disk 9 disposed to closely surround the radial compressor 8. The compressor 8 and rotor shroud disk 9 are replaceable in order that the work absorbing capacity can be broadened beyond that achieved by varying air density. Shroud disk 9 has a central opening 10 to permit the flow of air to the radial compressor. The compressor cavity defined by the inner or compressor face of the shroud disk 9 has an air exit communication path to the cavity defined by the outer faces of the shroud disk 9 and the main stator housing 3. This communication is provided by a series of U-shaped tubes which have one end open to the outer or high compression area of the compressor cavity. For clarity of illustration only two of these U-shaped tubes 11 are shown in Fig. 1. The other end of each of these tubes 11 may be open to any portion of the cavity defined by the outer faces of disk 9 and the housing 3. The series of tubes 11 are enclosed in an annular well 12 which is mounted on and forms a part of the main stator housing 3. Cooling water is supplied to the bottom of annular well 12 through an inlet pipe 13 located coaxial to housing 3. An outlet pipe 14 is connected to the top of well 12 to radially discharge the coolant from the well and complete the circulatory path therethrough. The dynamometer input shaft 6 may be secured by coupling 28 directly to the unit under test 29.

Information as to the speed at which the dynamometer shaft is driven may be picked up by an induction generator. The induction generator is shown in the drawing as a permanent magnet 15 having a coil 16 wound thereon and together mounted on the stationary support 1. A piece of ferrous metal 17 is mounted on the dynamometer shaft 6 adjacent the permanent magnet 15 to produce a signal in coil 16 for each rotation of the metal piece past the permanent magnet 15. The signals from coil 16 are applied to an electronic integrating tachometer 18 of any standard type. An electronic counter may be used instead of the electronic integrating tachometer.

As the compressor is rotated air is compressed and forced radially outward to circulate through the tubes 11. The friction of the compressed air against the shroud disk 9 tends to impart a rotational force to the shroud 9 and hence to the entire main stator housing 3. Although the main stator housing is rotatively mounted, it is restrained from excessive rotation through springs described below which actually restrict its rotation to the order of 1 degree.

Referring now to Fig. 2, the amount of rotation actually experienced by the stator housing 3 is measured by a linear differential transformer 19 whose output is connected to a voltmeter 20 which may be calibrated in terms of torque exerted by the unit under test. Transformer 19 is mounted on vertical support 1 and is driven by a plunegr 19a which is mounted on the dynamometer housing 3 by a support 21 and is rotated therewith. A cantilever spring 30 mounted on support 1 is shown in Fig. 2. The rotational force imparted to housing 3 is exerted against spring 30 through adjustable stop 31 mounted on support 21. For measuring small loads spring 30 and stop 31 may be eliminated or stop 31 backed off to clear spring 30 since it was found that for such loads the water inlet pipe 13 will serve the dual function of torsional restraining spring and coolant supply pipe.

To extend the range of power measurable by this system, the density of the air worked on by the compressor may be controlled as shown in Fig. 1. For measuring higher power levels the density may be increased by connecting the interior of housing 3 to a compressed air supply 22. This connection must be made through a flexible hose 23 to avoid interference with the rotation of housing 3. For the same reason, the water outlet line 14 is supported only by housing 3 and is open at its discharge end. Outlet line 14 may discharge through a hole 14a in the dynamometer base. A valve 24 and an air pressure gage 25 are included in the compressed air line for controlling and determining the pressure of the air in housing 3. A valve 26 is connected through a T-connection 27 to a vacuum line for reducing the pressure or density of the air in housing 3. Through this connection the air density may be reduced below atmospheric pressure.

Considering now the operation of this system, the shaft of the unit under test is coupled directly to the shaft of the dynamometer, which is free to rotate within the dynamometer housing. On the end of the dynamometer shaft is the radial compressor which is driven by the unit under test. The load for this radial compressor is the air in the enclosed dynamometer housing. When the compressor is rotated at high speed, a pressure gradient is established radially from the center of the enclosed housing outward. This causes air to flow as shown by the arrows in the drawing. A compression of the air by the action of the radial compressor causes a temperature rise. The air is cooled by passage through the U-shaped tubes. These tubes are enclosed in an annular well through which cold water is circulated. The cool air is returned to the center of the dynamometer where it is again compressed and heated. By this method the energy generated by the unit under test is absorbed. In addition to the radial compression, angular momentum is imparted to the air mass compressed. The friction between this rotating air mass and the adjacent surface of the housing imparts a slight rotation to the entire dynamometer housing. This rotation is restrained to amplitudes less than 1 degree by the water inlet pipe for small loads and by a cantilever spring for large loads. The angular rotation of the dynamometer housing is measured by a linear differential transformer. When it is desired to absorb larger amounts of power than can be handled by air at atmospheric pressure, the pressure of the air is increased by opening the valve to the compressed air supply. In the dynamometer described, pressure was varied over ranges of 100 pounds per square inch absolute to 0.2 pound per square inch absolute to give variable loading over a 500 to 1 range. The range may be further increased to measure even larger torque by changing the replaceable compressor motor and shroud disk so as to circulate more air per revolution, or by using a gas denser than air in the closed circulation path. The speed of the unit under test is measured by an inductor generator operated by the dynamometer input shaft. Information as to the speed of the dynamometer shaft is essential since power is speed times torque and the power absorption capacity of the dynamometer varies with the square of the speed. This is true since the kinetic energy imparted to the circulating air is a function of the square of the tip velocity of the rotor.

Obviously many modifications and variations of the present invention are possible in the light of the above teachings. It is therefore to be understood that within the scope of the appended claims the invention may be practiced otherwise than as specifically described.

What is claimed is:

1. An air absorption dynamometer comprising, a compartmented stator housing rotatably mounted and torsionally restrained, a vaned rotor disposed within a first compartment of said housing and having a shaft protruding therefrom for attachment to a unit under test, a shroud disk substantially surrounding said rotor and with said housing forming said first compartment, a second compartment in said stator housing substantially surrounding said first compartment and having an air inlet thereto at the axial center of said shroud disk, a series of pipes each connecting the first compartment to the second near the respective outer periphery of each to form a closed air circulation path therebetween, a third compartment in said housing disposed to enclose said series of pipes, and a cooling fluid inlet and outlet for said third compartment.

2. An air absorption dynamometer comprising, a rotatably mounted housing having first, second and third axially disposed compartments, means for restraining rotary motion thereof, a vaned rotor disposed within said first compartment and having a shaft protruding from said housing for attachment to a unit under test, a shroud disk forming the boundary between said first and second compartments and having a cutaway portion at the axial center thereof, a series of pipes each connecting the first compartment to the second near the respective outer periphery of each to form a closed air circulation path therebetween, said third compartment being disposed to enclose said series of pipes, and a cooling fluid inlet and outlet for said third compartment.

3. An air absorption dynamometer comprising, a rotatably mounted housing having first, second and third axially disposed compartments, means for restraining rotary motion thereof, a vaned rotor disposed within said first compartment and having a shaft protruding from said housing for attachment to a unit under test, a shroud disk forming the boundary between said first and second compartments and having a cutaway portion at the axial center thereof, a series of pipes each connecting the first compartment to the second near the respective outer periphery of each to form a closed air circulation path therebetween, said third compartment being disposed to enclose said series of pipes, and a cooling fluid inlet and outlet for said third compartment, a compressed air supply flexibly connected to said second compartment, and means for controlling the static air pressure in said second compartment.

4. An air absorption dynamometer comprising, a rotatably mounted housing having first, second and third axially disposed compartments, a vaned rotor disposed within said first compartment and having a shaft protruding from said housing for attachment to a unit under test, a shroud disk forming the boundary between said first and second compartments and having a cutaway portion at the axial center thereof, a series of pipes each connecting the first compartment to the second near the respective outer periphery of each to form a closed air circulation path therebetween, said third compartment being disposed to enclose said series of pipes, and a cooling fluid inlet and outlet for said third compartment, a resilient cooling supply pipe having one end connected to the cooling fluid inlet of said third compartment and having another portion thereof rigidly mounted on the mounting for said housing to provide torsional restraint therefor.

5. An air absorption dynamometer comprising, a rotatably mounted housing having first, second and third axially disposed compartments, a vaned rotor disposed within said first compartment and having a shaft protruding from said housing for attachment to a unit under test, a shroud disk forming the boundary between said first and second compartments and having a cutaway portion at the axial center thereof, a series of pipes each connecting the first compartment to the second near the respective outer periphery of each to form a closed air circulation path therebetween, said third compartment being disposed to enclose said series of pipes, a cooling fluid inlet and outlet for said third compartment, a resilient cooling supply pipe having one end connected to the cooling fluid inlet of said third compartment and having another portion thereof rigidly mounted on the mounting for said housing to provide torsional restraint therefor, a compressed air supply flexibly connected to said second compartment, and means for controlling the static air pressure in said second compartment.

6. An air absorption dynamometer comprising, a rotatably mounted housing having first, second and third axially disposed compartments, a vaned rotor disposed within said first compartment and having a shaft protruding from said housing for attachment to a unit under test, a shroud disk forming the boundary between said first and second compartments and having a cutaway portion at the axial center thereof, a series of pipes each connecting the first compartment to the second near the respective outer periphery of each to form a closed air circulation path therebetween, said third compartment being disposed to enclose said series of pipes, a cooling fluid inlet and outlet for said third compartment, a resilient cooling supply pipe having one end connected to the cooling fluid inlet of said third compartment and having another portion thereof rigidly mounted on the mounting for said housing to provide torsional restraint therefor, a compressed air supply flexibly connected to said second compartment, means for controlling the static air pressure in said second compartment, a linear differential transformer mechanically coupled to said housing for measuring the rotation thereof, an inductor generator associated with said rotor shaft for producing a signal responsive to each rotation thereof, and an electronic counter connected to said inductor generator for determining the speed of said shaft.

References Cited in the file of this patent

UNITED STATES PATENTS

| | | |
|---|---|---|
| 2,581,990 | Weber | Jan. 8, 1952 |
| 2,634,830 | Cline | Apr. 14, 1953 |
| 2,672,953 | Cline | Mar. 23, 1954 |
| 2,672,954 | Bennett | Mar. 23, 1954 |